United States Patent
Uszkoreit et al.

(10) Patent No.: US 9,183,196 B1
(45) Date of Patent: Nov. 10, 2015

(54) PARSING ANNOTATOR FRAMEWORK FROM EXTERNAL SERVICES

(71) Applicant: Google Inc., Mountain View, CA (US)

(72) Inventors: Jakob D. Uszkoreit, San Francisco, CA (US); Percy Liang, Palo Alto, CA (US); Daniel M. Bikel, Mount Kisco, NY (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 13/926,915

(22) Filed: Jun. 25, 2013

(51) Int. Cl.
*G06F 17/27* (2006.01)
*G06F 17/28* (2006.01)

(52) U.S. Cl.
CPC .............. *G06F 17/28* (2013.01); *G06F 17/271* (2013.01); *G06F 17/2755* (2013.01); *G06F 17/2715* (2013.01)

(58) Field of Classification Search
CPC  G06F 17/271; G06F 17/2715; G06F 17/2755
See application file for complete search history.

(56) References Cited

U.S. PATENT DOCUMENTS

| | | | |
|---|---|---|---|
| 5,212,821 A | | 5/1993 | Gorin et al. |
| 5,797,123 A | * | 8/1998 | Chou et al. ................. 704/256.5 |
| 6,631,346 B1 | * | 10/2003 | Karaorman et al. .............. 704/9 |
| 7,996,211 B2 | * | 8/2011 | Gao et al. ........................... 704/9 |
| 2005/0027512 A1 | * | 2/2005 | Waise ............................... 704/9 |
| 2006/0190261 A1 | * | 8/2006 | Wang ............................ 704/260 |
| 2010/0204982 A1 | * | 8/2010 | Weng et al. ....................... 704/9 |
| 2012/0290509 A1 | | 11/2012 | Heck et al. |

FOREIGN PATENT DOCUMENTS

| | | |
|---|---|---|
| EP | 834862 A2 | 4/1998 |
| WO | WO0014727 A1 | 3/2000 |

OTHER PUBLICATIONS

Bonino et al., "Dynamic Optimization of Semantic Annotation Relevance" in Evolutionary Computation CEC2004, Congress on Evolutionary Computation, 2004, pp. 1301-1308.
Chen et al., "Diverse Topic Phrase Extraction from Text Collection" WWW 2006, 9 pages.
Gorin et al., "An Experiment in Spoken Language Acquisition", IEEE Transactions on Speech and Audio Processing, 2 (1)(II), 1994, pp. 224-240.
Gupta et al., "Segmenting Spoken Language Utterances Into Clauses for Semantic Classification" in Automatic Speech Recognition and Understanding (ASRU 2003), 2003 IEEE Workshop, pp. 525-530.

(Continued)

*Primary Examiner* — Samuel G Neway
(74) *Attorney, Agent, or Firm* — Fish & Richardson P.C.

(57) ABSTRACT

A language processing system uses annotation services that are external to the language processing system to identify n-grams that identify entities in an input sentence. The n-grams are annotated by the annotation services. The annotations are used to determine which n-grams, if any, correspond to instances of an entity type (e.g., values for a variable or terminals for a non-terminal). After determining which n-grams correspond to entity types, parse initializations are generated for parsing rules and parses for each rule are attempted. The rules that successfully parse are used to determine whether the input sentence invokes a specific action, and if so, what arguments are to be passed to the invocation of the action.

15 Claims, 3 Drawing Sheets

(56) References Cited

OTHER PUBLICATIONS

Kawahara et al., "Topic Independent Language Model for Key-Phrase Detection and Verification", Acoustics, Speech, and Signal Processing, 1999, 1999 IEEE International Conference, pp. 685-688.

Krulwich et al., "Learning user information interests through the extraction of semantically significant phrases" AAAI Technology Report SS-96-05, Compilation, pp. 110-112.

Lee et al., "Utterance-Level Latent Topic Transition Modeling for Spoken Documents and its Application in Automatic Summarization" in Acoustics, Speech and Signal Processing (ICASSP), 2012 IEEE International Conference, 2012, pp. 5065-5068. [online] [Retrieved on Jan. 31, 2013], Retrieved from the internet:http://www.cs.cmu.edu/~yvchen/doc/ICASSP12_LTModel.pdf.

Lehuen et al., "A Robust Semantic Parser Designed for Spoken Dialog Systems" in 2010 IEEE Fourth International Conference on Semantic Computing (ICSC), 2010, pp. 52-55.

Tur et al., "Semi-Supervised Learning for Spoken Language Understanding Using Semantic Role Labeling" in Automatic Speech Recognition and Understanding (ASRU 2005), pp. 232-237. [online] [Retrieved on Jan. 31, 2013], Retrieved from the internet: http://www.cs.cmu.edu/~ananlada/SemanticRoleLabelingASRU05.pdf.

Wong et al., "Improvements on a Semi-Automatic Grammar Induction Framework" in IEEE Automatic Speech Recognition and Understanding Workshop, 2001, pp. 288-291. [online] [Retrieved on Jan. 31, 2013], Retrieved from the internet: http://www1.se.cuhk.edu.hk/~hccl/publications/pub/Meng_ASRU2001_NLU.pdf.

Wu et al., "KIP: A Keyphrase Identification Program with Learning Functions" in Proceedings of the International Conference on Information Technology: Coding and Computing (ITCC'04), vol. 2, 5 pages.

Yaman et al., "An Integrative and Discriminative Technique for Spoken Utterance Classification" IEEE Transactions on Audio, Speech, and Language Processing, 16(6), 2008, pp. 1207-1214. [online] [Retrieved on Jan. 31, 2013], Retrieved from the internet: http://www1.icsi.berkeley.edu/~sibel/TASL-SUC.pdf.

\* cited by examiner

PARSING ANNOTATOR FRAMEWORK FROM EXTERNAL SERVICES

BACKGROUND

This specification relates to speech recognition and speech understanding systems.

Speech recognition and speech processing systems are prevalent in many consumer electronic devices. Many of these electronic devices now utilize speech command processing techniques to invoke and perform particular operations. For example, a user device, such as a smart phone, can process speech commands to perform specified operations that include searching the web, setting an alarm, calling a particular person, and so on.

A user device uses a speech recognition processing system to recognize and process speech commands. A provider of the speech recognition and processing system develops parsing rules for various commands a user will speak. Upon a successful parse of a command input by a rule, an action associated with the rule is performed (or may be performed subject to user confirmation). Parsing rules specify particular entity types, such as person names, business names, locations, and so on. There are, however, a very large number of instances of each entity type. For example, there are millions of person names, and millions of business names, and new instances emerge each day.

SUMMARY

In general, one innovative aspect of the subject matter described in this specification can be embodied in methods that include the actions of providing, by a data processing apparatus, a command sentence having a plurality of n-grams to a plurality of annotation services, wherein each annotation service identifies, in the command input sentence, n-grams that identify an entity of an entity type that is particular to the annotation service; receiving from each annotation service annotations of n-grams in the command sentence, each annotation identifying one or more n-grams in the command sentence that identify an entity of the entity type particular from the annotation service; determining, from the command input sentence and the annotations, a plurality of parsing initializations, each parsing initialization being the command input sentence and at least one of the annotations of n-grams in the command input sentence; for each parsing initialization, parsing the command input sentence by a plurality of parsing rules, wherein: each parsing rule is associated with a particular action; and a complete parse of the command input sentence by parsing rule yields a successful parse, and an incomplete parse of the command input sentence yields an unsuccessful parse; and determining from the parsing rules that yield a successful parse an action to be performed by a user device for the command sentence. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The system allows a parser to process terminals and non-terminals of grammars without requiring the grammars to include a list of each instance of a non-terminal. Instead, the determination of non-terminals is performed by annotation services, which are services that are external to the language processing system and that are programmed or trained to identify instances of particular entity types in a sentence. This enables the formation of relatively compact parsing rules that do not require an enumerated list of all instances of non-terminals or variable values. The "offloading" the complexity of entity identification to external services reduces the maintenance and updating of the rule sets with respect to instances of particular entity types that correspond to the non-terminals (or other variable types) of the rule sets.

The rules may be in the form of context free grammars that facilitate a bottom-up parse of an input sentence. By implementing a bottom-up parse, only the grammars that successfully parse to a start symbol S root node can be used to determine whether a corresponding action is invoked.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A language processing system uses annotation services that are external to the language processing system to identify n-grams that identify entities in an input sentence. The n-grams are annotated by the annotation services. The annotations are used to determine which n-grams, if any, correspond to instances of an entity type (e.g., values for a variable or terminals for a non-terminal). After determining which n-grams correspond to entity types, parse initializations are generated for parsing rules and parses for each rule are attempted. The rules that successfully parse are used to determine whether the input sentence invokes a specific action, and if so, what arguments are to be passed to the invocation of the action.

Figure 1:
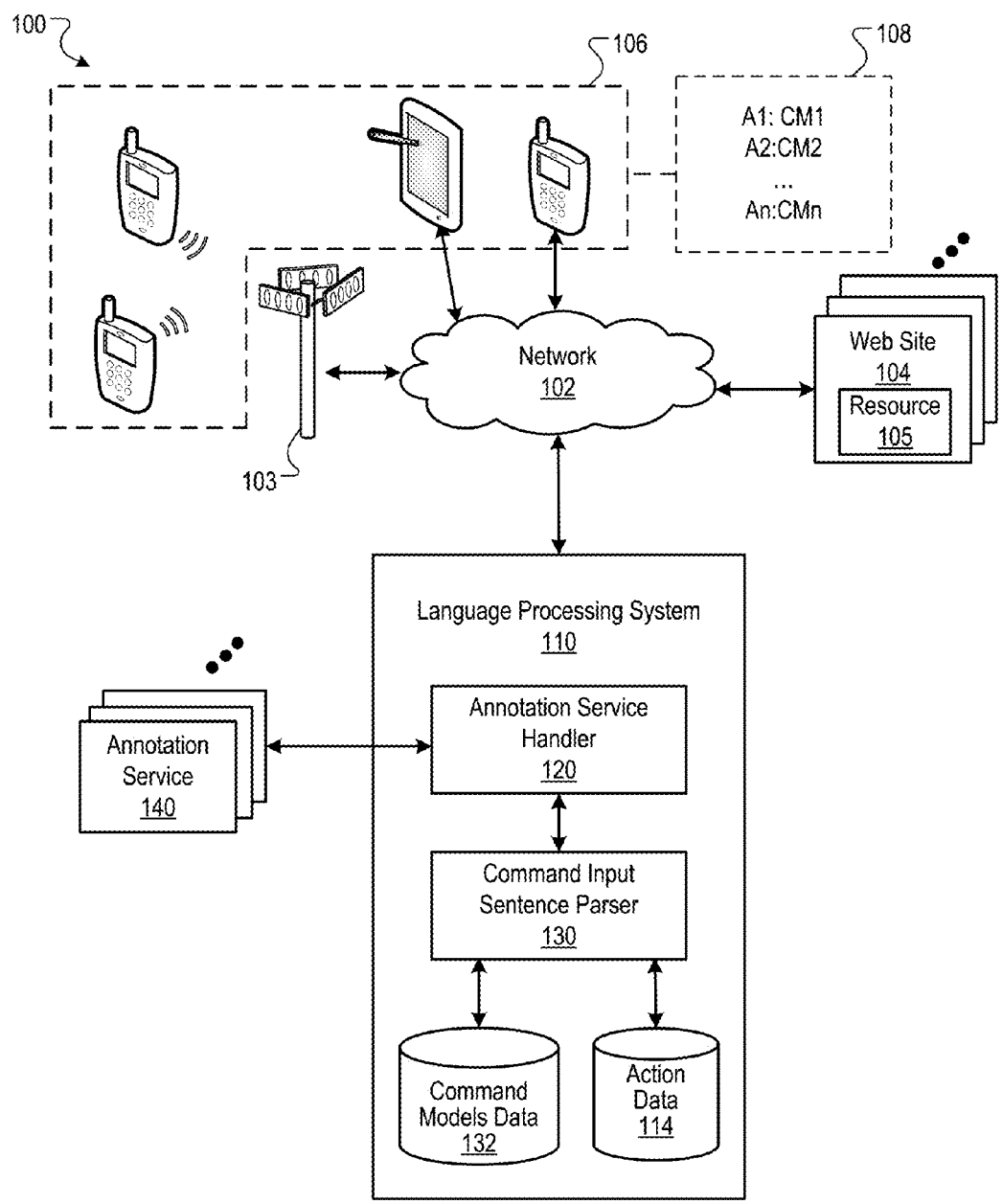
FIG. 1 is a block diagram of an environment in which annotation services are used to facilitate parsing initializations of command inputs.

FIG. 1 is a block diagram of an environment in which the command models for corresponding actions are utilized. A computer network 102, such as a local area network (LAN), wide area network (WAN), the Internet, or a combination thereof, provides for data communication between electronic devices and systems. Examples of such electronic device and systems include web sites 104 and user devices 106. The computer network 102 may also be included, or be in data communication with, one or more wireless networks 103.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104. A resource 105 is any data that can be provided by the website 104 over the network 102 and that is associated with a resource address.

A user device 106 is an electronic device that is under the control of a user and is capable of requesting and receiving resources over the network 102, establishing communication channels, e.g., voice communications, with other user devices 106, and also capable of performing other actions. Example user devices 106 include personal computers, mobile communication devices, and other devices that can send and receive data over the network 102. An example mobile user device 106, such as a smart phone, is described with reference to FIG. 4 below. The user devices 106 may communicate over the networks 102 and 103 by means of wired and wireless connections with the networks 102 and 103.

As described with reference to FIG. 4, a user device may be able to perform a set of device actions for various programs and capabilities. The actions may differ from each other for each action. For example, a telephone functionality may include the action placing a call in response to the commands of "call" or "phone," a particular contact, and may also include the action of "texting" the particular contact in response to the commands to "text" or "message" the particular contact; a calendar application may include the actions of "scheduling" a meeting or reminder in response to the command of "schedule," "accepting" or "declining" an invitation in response to the command to "accept" or "decline," the invitation; a mapping service may include the actions of "mapping" a location in response to the command to "map" a location; and so on. The actions may be performed entirely by the user device, e.g., in the case of placing a phone call, or the user device may invoke an external service to perform the action, e.g., a map service or a search engine service.

In some implementations, the user device 106 utilizes a voice recognition system that receives voice input, performs language recognition processing, and parses the resulting recognized words and phrases. The parsed words and phrases, which are referred to as n-grams, where each n-gram may constitute one or more words, are then processed to determine whether the voice input invokes a particular action.

As will be described in more detail below, each action A1, A2 . . . An has a corresponding command model CM1, CM2 . . . CMn, as indicated by the phantom box 108. The user device 106 utilizes the command models CMx to determine which, if any, actions are invoked in response to a voice input. As will be described in more detail the below, the command models are, in some implementations, grammars that describe sentence structures for particular commands. Other appropriate command models may also be used.

As used in this specification, "command input" or "command input sentence" can be an input sentence, a query, or any other input that has one or more terms. The input does not need to be a grammatically correct and complete sentence, e.g., it need not have both a predicate and a subject. For example, the following input would constitute a command input, but would not constitute a grammatically complete sentence: "Images of lions." A command input need not have an associated parsing rule, nor have annotations or other data describing terms of the command input. The language processing system, in some implementations, can process command inputs to generate a parsing rule and provide such annotations. In general, any input of one or more terms can be a command input, regardless of whether the particular command input is associated with other language processing data, such as parsing rules, parts of speech tagging, etc.

In some implementations, a language processing system 110 is used to parse the command input sentence and determine which, if any action, is to be performed. As shown in FIG. 1, the language processing system 110 is separate from the user devices. However, the language processing system 110 can also be implemented within each user device.

The language processing system 110 receives command input sentences from user devices 106 and provides responsive data back to the user devices. Such responsive data may be, for example, a fully parsed sentence, the action invoked, and arguments to be passed to the service that performs the action.

The language processing system 110 includes command models data 132 that associates actions with corresponding command models by use of parsing rules, such as grammars. The command models data 132 store command models for actions specified by action data 114, and can be provided by a service external to the language processing system 110. In some implementations, the command models are each configured to generate an action score for an action for an input sentence based on, for example, a semantic meaning of the input sentence.

An example language processing system 110 includes an annotation service handler 120 and a command input sentence parser 130. The example architecture is illustrative only, and other appropriate functional architectures can also be used. When the language processing system 110 receives an input sentence, the system 110 provides the command input sentence to the annotation services 140. The annotation services 140 provide annotations in response, and the system 110 parses the input sentence using the annotations.

Figure 2:
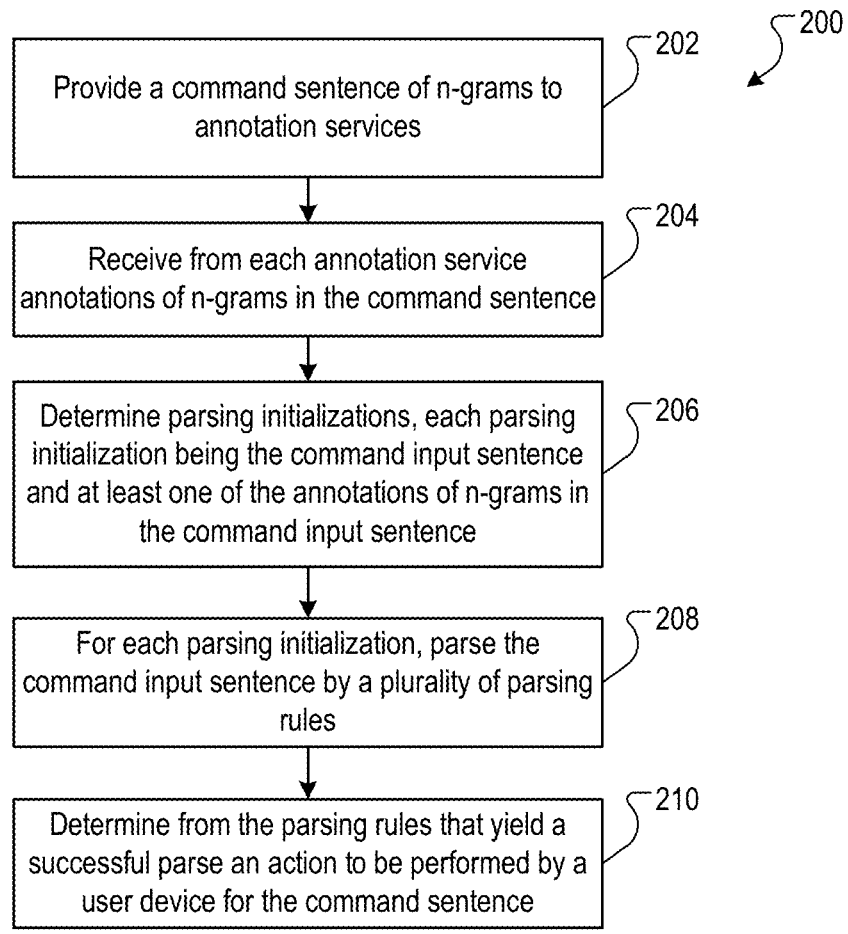
FIG. 2 is a flow diagram of an example process for generating parsing initializations from a command input sentence and annotations, and determining a resulting action.

The annotating and parsing of an input sentence is described with reference to FIG. 2, which is a flow diagram of an example process 200 for generating parsing initializations from a command input sentence and annotations, and determining a resulting action. The process 200 can be implemented in a user device, or, alternatively, can be implemented in a service external to the user device and that processes command input sentences for the user device.

The language processing system 110 provides a command sentence of n-grams to annotation services 140. For example, the annotation service handler 120 provides the command input sentence to annotation services 140. The annotation service handler 120 is, for example, a device or subsystem that is programmed to send data to and receive data from annotation services 140. Each annotation service identifies, in the command input sentence, n-grams that identify an entity of an entity type that is particular to the annotation service. For example, a first user device may receive the command input sentence "Text Jane Maddisons that I am running late." The command input sentence is provided to the annotation services 140. One of the annotation services 140 is, for example, a person name identifier that identifies person names in a sentence. Another annotation service 140 is, for example, a business name identifier that identifies business names in a sentence. Other annotation services 140 may also be available, such as landmark annotation services, medical annotation services, etc.

The language processing system 110 receives, from each annotation service, annotations of n-grams in the command sentence (204). For example, the annotation service handler 120 receives the annotations from the annotation services. Each annotation identifies one or more n-grams in the command sentence that identify an entity of the entity type particular from the annotation service. Each service 140 may also provide more than one set of annotations. For example, for the sentence above, assume the person name annotation may provide the following annotations as a person name: [Jane], [Maddisons], and [Jane Maddisons] to indicate possible person names. Likewise, assume that there exists a business entity with the name "Maddisons." The business name annotation service thus provides the annotation of [Maddisons] to indicate a possible business name.

The language processing system 110 determines parsing initializations, each of which is the command input sentence and at least one of the annotations of n-grams in the command input sentence (206). For example, for the annotations from the person name annotation service, the command input parser 130 generates the following parsing initialization:

Text Jane: Per_Name Maddisons that I am running late tonight
Text Jane Maddisons: Per_Name that I am running late tonight
Text [Jane Maddisons]: Per_Name that I am running late tonight In the sentences above, the annotation Per_Name is appended to the n-gram that the name annotation service has identified as a person name. For a unigram, the annotation is appended to the single term. For an n-gram where n is two or more, the annotation is appended to a closing bracket of a bracket pair that encloses the n-gram. Likewise, for the annotations from the person name annotation service, the following parsing initialization is generated:

Text Jane Maddisons: Bus_Name that I am running late tonight

Figure 3:
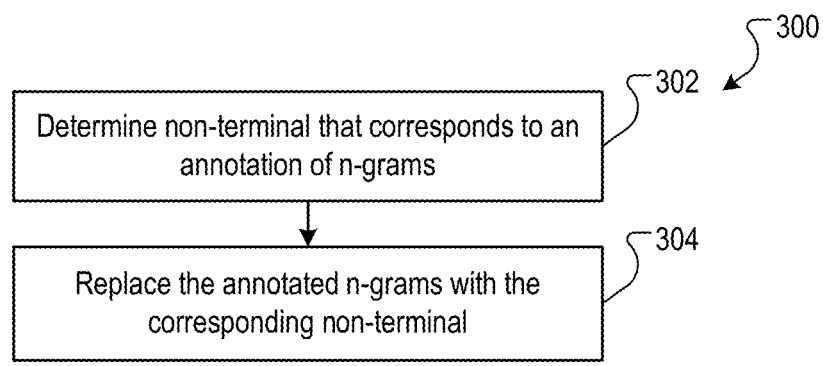
FIG. 3 is a flow diagram of an example process for generating a parsing initialization.

In implementations in which grammars are used as the parsing rules, determining each parsing initialization can further involve replacing, for each annotation, the annotated n-grams of the command input sentence with a non-terminal of the entity type of the annotation service. This process is described with reference to FIG. 3.

The process 300 determines a non-terminal that corresponds to an annotation of n-grams (302). For example, assume the non-terminal for a grammar rule associated with a texting action is <Recipient>, which maps to person names and business names, as such names are often used as contact aliases. The process 300 then replaces the annotated n-grams with the corresponding non-terminals (304). The resulting parse initializations are:

Text <Recipient> Maddisons that I am running late tonight.
Text Jane <Recipient> that I am running late tonight.
Text <Recipient> that I am running late tonight.
Text Jane <Recipient> that I am running late tonight.

The system 110, for each parsing initialization, parses the command input sentence by the parsing rules (208). For example, for each parsing initialization above, the command input sentence parser 130 attempts a bottom-up parse of the input sentence using the initialized rule. Assume one of the parsing rules is a grammar of the form:

G=<T, N, S, R>;
where:
T={Text, that}
N={Recipient, Message}
S=S
R={
S→Text <Recipient> that <Message>
Recipient→Per_Name, Bus_Name
Message→{•}
}

Thus, for the terminals defined above, a parse of "Text to Jane Maddison that I am running late tonight" would yield:
S→Text <Recipient> that <Message>

For the non-terminal <Recipient>, the terminal Per_Name and Bus_Name are defined. For the non-terminal <Message>, an open set of terminals is defined.

The system 110 determine from the parsing rules that yield a successful parse an action to be performed by a user device for the command sentence (210). Each parsing rule is associated with a particular action. For example, for the rules above, each is associated with a "text" action. A complete parse of the command input sentence by a parsing rule yields a successful parse, and an incomplete parse of the command input sentence yields an unsuccessful parse. From the rules above, the only rule that will completely consume the command input sentence to yield a successful parse is:

Text <Recipient> that I am running late tonight.

This is because the start symbol S→Text <Recipient> that <Message> completely consumes "Text Jane Maddisons that I am running late tonight," while the other start symbols do not. Accordingly, a text action is initiated at the user device that provided the command input sentence. The recipient is the contact identified by "Jane Maddisons" and the message is "I am running late tonight."

The example above provided a general case for one set of rules associated with a text action. In practice, however, there are multiple rules for multiple actions, and more than one rule may successfully parse. Accordingly, the system 110 generates an action score for the action from a bottom-up parse of the command input sentence using the grammar and a parsing initialization that matches the grammar. For example, the command models can be configured to generate, or facilitate the generation of, an action score according to any appropriate scoring algorithm. In some implementations, the action score may be based on a semantic score that is a measure of semantic meaning for the grammar for which there is a successful parse. For example, the semantic score may be based on the arguments of the semantic yields for each non-terminal being arguments that belong to a category defined by the non-terminal. To illustrate, for the command input sentence "Text to Page that I just left work and will be home in 30 minutes," the semantic score will be relative high as the semantic yield of the non-terminal <Recipient> is a recipient in an address book on the user device, and the semantic yield of the non-terminal <Message> appears to be terms that do not invoke other actions.

The action score may also be based, in part, on the number of terminals consumed for each non-terminals to result in a successful parse. The more terminals that are required to consume a non-terminal may result in a lower action score. For example, consider the two start symbols for two different actions, the first being a text message action and the second being a voice memo action, and a command input sentence:

S→Terms1> <Recipient> <Terms2> <Message>
S→Memo Command> <Memo Text>
Voice memo Julia we have a party tomorrow and I need you to pick up cupcakes.

Assume also that the non-terminal "Memo Command" maps to the terminals "voice" and "memo." Both rules will fully consume the command input sentence up to the start symbol node. However, for the first start symbol corresponding to the text message action, there is some ambiguity with respect to the consumption of terms by the non-terminals <Terms2> and <Message>, i.e., there is no single successful parse of the terms. Conversely, for the second start symbol corresponding to the voice memo action, there is much less ambiguity, as the non-terminal <Memo Command> may only consume the terms "Voice memo." Accordingly, consumption up to the second start symbol will result in a higher score than consumption up to the first start symbol, as the second start symbol is reached by a more accurate, less ambiguous parse.

The scoring processes described above are examples of several appropriate scoring techniques that can be used. Other appropriate scoring techniques can also be used, however.

Figure 4:
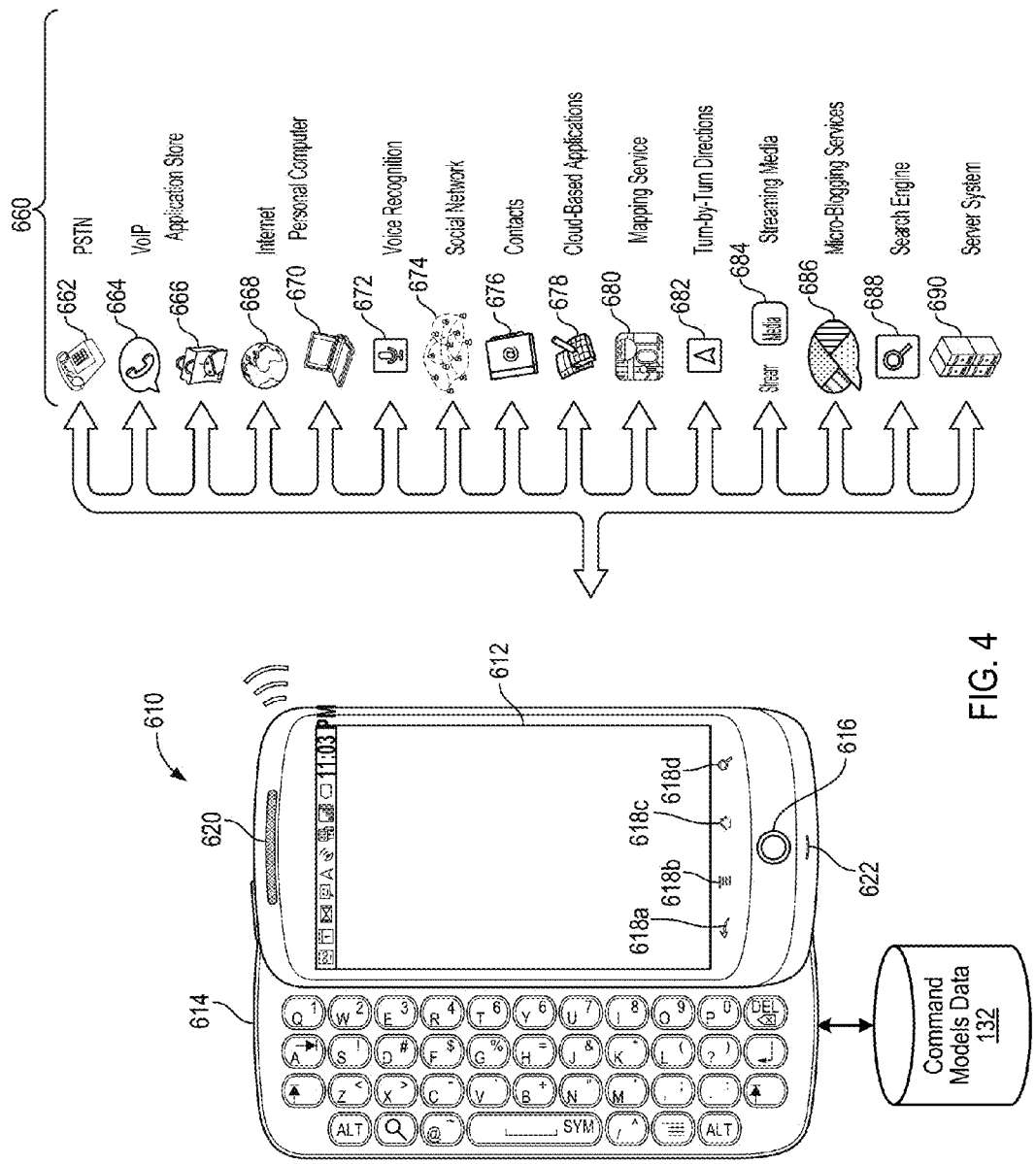
FIG. 4 is a block diagram of an example mobile computing device.

FIG. 4 is a block diagram of example mobile computing device. In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

The mobile computing device 610 may include other applications, computing sub-systems, and hardware. A voice recognition service 672 may receive voice communication data received by the mobile computing device's microphone 622, and translate the voice communication into corresponding textual data or perform voice recognition. The processed voice data can be input to the command models stored in the command models data 132 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 610 to the network 660 to enable communication between the mobile computing device 610 and other computing systems that provide services 660. The services 660 may be provided over different networks (e.g., the service provider's internal network, the Public Switched Telephone Network, and the Internet). The service provider may operate a server system that routes information packets and voice data between the mobile computing device 610 and computing systems associated with the services 660.

An application store 666 may provide a user of the mobile computing device 610 the ability to browse a list of remotely stored application programs that the user may download over the network and install on the mobile computing device 610. The application store 666 may serve as a repository of applications developed by third-party application developers. An application program that is installed on the mobile computing device 610 may be able to communicate over the network with server systems that are designated for the application program. For example, a VoIP application program may be downloaded from the Application Store 666, enabling the user to communicate with the VoIP service 664.

The mobile computing device 610 may access content on the internet 668 through network. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through the network. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program.

Mapping service 680 can provide the mobile computing device 610 with street maps, route planning information, and satellite images. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, the method comprising:
   providing, by a data processing apparatus, a command input sentence having a plurality of n-grams to a plurality of annotation services, wherein each annotation service identifies, in the command input sentence, n-grams that identify an entity of an entity type that is particular to the annotation service, and wherein the entity type for each annotation service is different from the entity type of each other annotation service;
   receiving from each annotation service annotations of n-grams in the command input sentence, each annotation identifying one or more n-grams in the command input sentence that identify an entity of the entity type particular from the annotation service;
   determining, from the command input sentence and the annotations, a plurality of parsing initializations, each parsing initialization being the command input sentence and at least one of the annotations of n-grams in the command input sentence;
   for each parsing initialization, parsing the command input sentence by a plurality of parsing rules, wherein:
      each parsing rule is a grammar defining one or more non-terminals and terminals, each non-terminal being of one of the entity types of the annotation services and not including list of each instance of the entity type;
      each parsing rule is associated with a particular action to be performed by a user device in response to a successful parse of a command input sentence by the parsing rule, and where a plurality of different actions are associated with a respective plurality of different parsing rules; and
      a complete parse of the command input sentence by parsing rule occurs when the one or more terminals and non-terminals completely consumes all n-grams of the command input sentence, and a complete parse yields a successful parse, and an incomplete parse of the command input sentence does not consume all n-grams of the command input sentence and yields an unsuccessful parse; and
   determining from only the parsing rules that yield a successful parse an action to be performed by a user device for the command input sentence.

2. The computer-implemented method of claim 1, wherein: determining each parsing initialization comprises replacing, for each annotation, the annotated n-grams of the command input sentence with a non-terminal of the entity type of the annotation service.

3. The computer-implemented method of claim 2, wherein the command input sentence is a voice command input sentence.

4. The computer-implemented method of claim 2, wherein determining from the parsing rules that yield a successful parse the action to be performed by a user device for the command input sentence comprises, for each grammar, the generation of an action score for the action from a bottom-up parse of the command input sentence using the grammar and a parsing initialization that matches the grammar.

5. The computer-implemented method of claim 2, wherein:
   each non-terminal type corresponds to a variable for the action; and
   for each non-terminal type, a semantic yield of a non-terminal of the non-terminal type defines an argument of the variable for the action.

6. A non-transitory computer readable storage medium storing instructions executable by a data processing apparatus and that upon such execution causes the data processing apparatus to perform operations comprising:
   providing, by a data processing apparatus, a command input sentence having a plurality of n-grams to a plurality of annotation services, wherein each annotation service identifies, in the command input sentence, n-grams that identify an entity of an entity type that is particular to the annotation service, and wherein the entity type for each annotation service is different from the entity type of each other annotation service;
   receiving from each annotation service annotations of n-grams in the command input sentence, each annotation identifying one or more n-grams in the command input sentence that identify an entity of the entity type particular from the annotation service;
   determining, from the command input sentence and the annotations, a plurality of parsing initializations, each parsing initialization being the command input sentence and at least one of the annotations of n-grams in the command input sentence;
   for each parsing initialization, parsing the command input sentence by a plurality of parsing rules, wherein:
      each parsing rule is a grammar defining one or more non-terminals and terminals, each non-terminal being of one of the entity types of the annotation services and not including a list of each instance of the entity type;
      each parsing rule is associated with a particular action to be performed by a user device in response to a successful parse of a command input sentence by the parsing rule, and where a plurality of different actions are associated with a respective plurality of different parsing rules; and
      a complete parse of the command input sentence by parsing rule occurs when the one or more terminals and non-terminals completely consumes all n-grams of the command input sentence, and a complete parse yields a successful parse, and an incomplete parse of the command input sentence does not consume all n-grams of the command input sentence and yields an unsuccessful parse; and
   determining from only the parsing rules that yield a successful parse an action to be performed by a user device for the command input sentence.

7. The non-transitory computer readable storage medium of claim 6, wherein:
  determining each parsing initialization comprises replacing, for each annotation, the annotated n-grams of the command input sentence with a non-terminal of the entity type of the annotation service.

8. The non-transitory computer readable storage medium of claim 7, wherein the command input sentence is a voice command input sentence.

9. The non-transitory computer readable storage medium of claim 7, wherein determining from the parsing rules that yield a successful parse the action to be performed by a user device for the command input sentence comprises, for each grammar, the generation of an action score for the action from a bottom-up parse of the command input sentence using the grammar and a parsing initialization that matches the grammar.

10. The non-transitory computer readable storage medium of claim 7, wherein:
  each non-terminal type corresponds to a variable for the action; and
  for each non-terminal type, a semantic yield of a non-terminal of the non-terminal type defines an argument of the variable for the action.

11. A system, comprising:
  a data processing apparatus; and
  a non-transitory computer readable storage medium in data communication with the data processing apparatus storing instructions executable by the data processing apparatus and that upon such execution causes the data processing apparatus to perform operations comprising:
  providing, by a data processing apparatus, a command input sentence having a plurality of n-grams to a plurality of annotation services, wherein each annotation service identifies, in the command input sentence, n-grams that identify an entity of an entity type that is particular to the annotation service, and wherein the entity type for each annotation service is different from the entity type of each other annotation service;
  receiving from each annotation service annotations of n-grams in the command input sentence, each annotation identifying one or more n-grams in the command input sentence that identify an entity of the entity type particular from the annotation service;
  determining, from the command input sentence and the annotations, a plurality of parsing initializations, each parsing initialization being the command input sentence and at least one of the annotations of n-grams in the command input sentence;
  for each parsing initialization, parsing the command input sentence by a plurality of parsing rules, wherein:
    each parsing rule is a grammar defining one or more non-terminals and terminals, each non-terminal being of one of the entity types of the annotation services and not including a list of each instance of the entity type;
    each parsing rule is associated with a particular action to be performed by a user device in response to a successful parse of a command input sentence by the parsing rule, and where a plurality of different actions are associated with a respective plurality of different parsing rules; and
    a complete parse of the command input sentence by parsing rule occurs when the one or more terminals and non-terminals completely consumes all n-grams of the command input sentence, and a complete parse yields a successful parse, and an incomplete parse of the command input sentence does not consume all n-grams of the command input sentence and yields an unsuccessful parse; and
  determining from only the parsing rules that yield a successful parse an action to be performed by a user device for the command input sentence.

12. The system of claim 11, wherein:
  determining each parsing initialization comprises replacing, for each annotation, the annotated n-grams of the command input sentence with a non-terminal of the entity type of the annotation service.

13. The system of claim 12, wherein the command input sentence is a voice command input sentence.

14. The system of claim 12, wherein determining from the parsing rules that yield a successful parse the action to be performed by a user device for the command input sentence comprises, for each grammar, the generation of an action score for the action from a bottom-up parse of the command input sentence using the grammar and a parsing initialization that matches the grammar.

15. The system of claim 12, wherein:
  each non-terminal type corresponds to a variable for the action; and
  for each non-terminal type, a semantic yield of a non-terminal of the non-terminal type defines an argument of the variable for the action.

\* \* \* \* \*